US008614952B2

(12) United States Patent
Rege et al.

(10) Patent No.: US 8,614,952 B2
(45) Date of Patent: Dec. 24, 2013

(54) EFFICIENT PROPAGATION OF LINK STATE ADVERTISEMENTS IN DENSELY INTERCONNECTED OSPF NETWORKS

(75) Inventors: Kiran M. Rege, Marlboro, NJ (US); Thyaga Nandagopal, Edison, NJ (US)

(73) Assignee: ALCATEL LUCENT, Paris (FR)

( * ) Notice: Subject to any disclaimer, the term of this patent is extended or adjusted under 35 U.S.C. 154(b) by 217 days.

(21) Appl. No.: 13/296,934

(22) Filed: Nov. 15, 2011

(65) Prior Publication Data

US 2013/0121156 A1 May 16, 2013

(51) Int. Cl.
*G08C 15/00* (2006.01)
(52) U.S. Cl.
USPC ............... 370/238; 370/256; 370/408
(58) Field of Classification Search
None
See application file for complete search history.

(56) References Cited

U.S. PATENT DOCUMENTS

| | | | |
|---|---|---|---|
| 7,266,085 B2 * | 9/2007 | Stine | 370/252 |
| 2005/0254448 A1 * | 11/2005 | Tang et al. | 370/328 |
| 2008/0198865 A1 * | 8/2008 | Rudnick et al. | 370/406 |
| 2012/0039164 A1 * | 2/2012 | Enyedi et al. | 370/217 |

* cited by examiner

*Primary Examiner* — Gregory Sefcheck
*Assistant Examiner* — Daniel Mitchell
(74) *Attorney, Agent, or Firm* — Kramer & Amado, P.C.

(57) ABSTRACT

A method for efficient propagation of link state advertisements in densely interconnected OSPF networks is disclosed for reducing the number of duplicate LSAs propagated during a flooding event. The efficient propagation method includes calculating an LSA propagation subgraph which is used by a node which receives an LSA to determine which links to propagate the LSA upon. This allows a significant reduction in the LSAs which traverse the network during a flooding event. The reduction in LSAs is particularly useful for reducing network convergence times associated with flooding events. In addition, a system is disclosed for performing the method in both a centralized and dispersed manner.

16 Claims, 8 Drawing Sheets

EFFICIENT PROPAGATION OF LINK STATE ADVERTISEMENTS IN DENSELY INTERCONNECTED OSPF NETWORKS

FIELD OF THE INVENTION

The invention relates generally to link state advertisement methods and is particularly concerned with a method of link state advertisement that reduces the number of duplicate link state advertisements during flooding events.

BACKGROUND OF THE INVENTION

OSPF (Open Shortest Path First) routing protocol is the predominant intra-domain routing protocol in the Internet. OSPF is a link-state routing protocol. In operation all routers running OSPF in a single area advertise the status of each of their links in a link-status message in a Link-State Advertisement (LSA) with a sequence number to indicate the time progression of multiple such messages from the same node. This message is sent on a hop-by-hop basis to all routers running OSPF within the area. For each link that fails, both end-points of the link (if they are still up) will generate a LSA message to be sent all over the network. Therefore, for each link failure, a node will get at most two unique LSAs per failure (not counting duplicate LSAs).

Since OSPF runs over the IP protocol, each node has information on all the IP-level links in the network area. This information includes the end-points of the link, the status of the link, the type of the link (e.g., point-to-point, broadcast), as well as the cost metric of the link. Using this information and the well-known Djikstra's Shortest Path Tree algorithm, a node will compute the best possible (least-cost) routes to every other node in the area. There can be multiple such areas within a single network domain. Routers advertise route summary LSAs between areas via so-called border routers that straddle multiple areas.

Message Overhead

OSPF standards dictate that all routers in an area running OSPF must receive a link status change notification from any OSPF router in the same area.

In the following disclosure for exemplary purposes the use of the term router assumes a network packet switching node assumed to be running OSPF and that all routers are in a single routing area.

Each LSA, when received by a router, is checked for duplicates. If it is not a duplicate, the LSA is flooded by the router on all its interfaces, other than the one on which the LSA was received. When all routers have a plurality of links (in a well-connected topology), many of these LSAs will be duplicate LSAs. Parsing these multiple duplicates takes significant time and delays the transmission of original/unique LSAs across the network. This delays network convergence to the order of several minutes in the worst case in rich network topologies seen in provider networks.

Therefore, it would be desirable to have a method and/or system capable of reducing the number of duplicate LSAs such that network convergence times are improved.

SUMMARY OF THE INVENTION

It is an object of the invention to provide a method and system of Link State Advertisement propagation which reduces the quantity of duplicate LSAs produced during a flooding event.

According to an aspect of the invention there is provided a method of reducing, in a network having a plurality of core nodes and a plurality of edge nodes connected by links, the number of duplicate LSAs propagated during a flooding event, the method having the steps of first, forming an LSA forwarding subgraph wherein the edges of the LSA forwarding subgraph correspond to the links, and the LSA forwarding subgraph comprises the union of a quantity K spanning-trees containing the core nodes and the links connecting the core nodes to the edge nodes, and wherein the K spanning-trees are edge-disjoint, and where within each of the K spanning-trees no core node can have a degree greater than quantity N, and where no core node appears as a non-leaf node in more than one tree of the quantity of K spanning-trees. Next upon a core node in the network receiving an LSA along a first link during the flooding event, the core node forwards the LSA along only a first subset of links corresponding to edges in the LSA forwarding subgraph; and upon an edge node in the network receiving an LSA along a first link during the flooding event, the edge node forwards the LSA along only a second subset of links corresponding to edges in the LSA forwarding subgraph.

In some variations of the method the first subset consists of any link that corresponds to edges in the LSA forwarding subgraph. In some embodiments using the method, the second subset has any link that corresponds to edges in the LSA forwarding subgraph while in other embodiments the second subset has no links.

In alternative embodiments of the method the first subset has those links that correspond to edges of the spanning-tree of the quantity K spanning-trees of which the first link is a member in the LSA forwarding subgraph. In some of these embodiments, the second subset has any link that corresponds to edges in the LSA forwarding subgraph while in other embodiments the second subset has no links.

According to another aspect of the invention there is disclosed a system that reduces the number of duplicate LSAs propagated during a flooding event, the system having: a plurality of core nodes; a plurality of edge nodes, and wherein the plurality of core nodes and the plurality of edge nodes are connected by links; an LSA forwarding subgraph calculator which automatically calculates an LSA forwarding subgraph wherein the edges of the LSA forwarding subgraph correspond to the links, and the LSA forwarding subgraph comprises the union of a quantity K spanning-trees containing the core nodes and the links connecting the core nodes to the edge nodes, and wherein the K spanning-trees are edge-disjoint, and where within each of the K spanning-trees no core node can have a degree greater than quantity N, and where no core node appears as a non-leaf node in more than one tree of the quantity of K spanning-trees; and a core node forwarding module in each core node of the plurality of core nodes which upon its respective core node receiving an LSA along a first link during the flooding event, the core node forwarding module forwarding the LSA along only a first subset of links corresponding to edges in the LSA forwarding subgraph; and an edge node forwarding module in each edge node of the plurality of edge nodes which upon its respective edge node receiving an LSA along a first link during the flooding event, the edge node forwarding module forwarding the LSA along only a second subset of links corresponding to edges in the LSA forwarding subgraph.

According to some variations of this embodiment the first subset has any link that corresponds to edges in the LSA forwarding subgraph. In some embodiments of this variation the second subset has any link that corresponds to edges in the LSA forwarding subgraph, while in other embodiments the second subset has no links.

In alternative embodiments of the first subset has those links that corresponds to edges of the spanning-tree of the quantity K spanning-trees of which the first link is a member in the LSA forwarding subgraph. In some variations of these embodiments the second subset has any link that corresponds to edges in the LSA forwarding subgraph, while in other embodiments the second subset has no links.

In yet other embodiments of the system the LSA forwarding subgraph calculator is located at a single location and propagates the LSA forwarding subgraph to the plurality of core nodes and the plurality of edge nodes. In yet further embodiments of the system the LSA forwarding subgraph calculator is located at each of the plurality of core nodes and the plurality of edge nodes.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

DETAILED DESCRIPTION

In the following figures, like reference numbers are used to represent like elements.

The implementation of methods of practicing embodiments of the invention involve the major steps of:
1. Constructing an LSA-forwarding sub-graph, and
2. Forwarding LSAs according to the forwarding graph during a flooding event.

In the following discussion, a method for constructing an LSA-forwarding subgraph is described first, followed by alternative embodiments of LSA-forwarding methods that can be used in conjunction with the LSA-forwarding subgraph.

Figure 1:
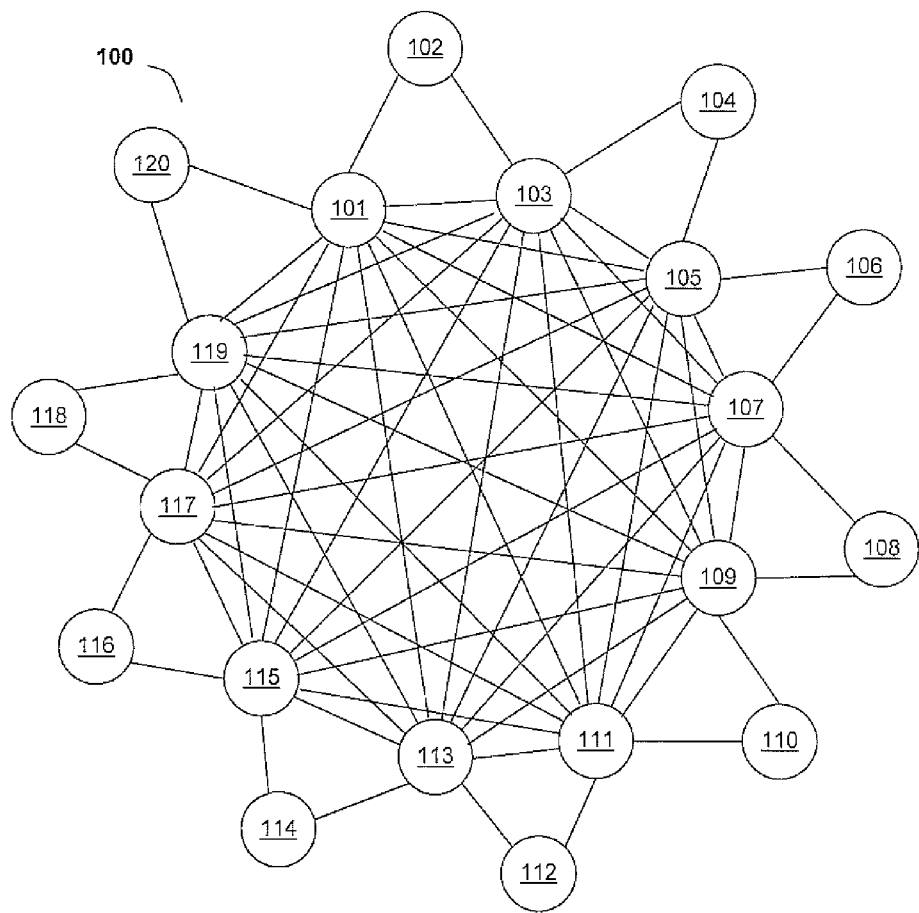
FIG. 1 illustrates an example of a communications network with dual-homed edge nodes and densely interconnected core nodes.

Referring now to FIG. 1, there may be seen an exemplary network shown containing ten core nodes 101, 103, 105, 107, 109, 111, 113, 115, 117, 119; and ten (provider) edge nodes 102, 104, 106, 108, 110, 112, 114, 116, 118, 120. Each core node is directly connected to every other core node, giving a fully connected mesh in the core network. Each edge node, on the other hand, is "dual-homed," i.e. connected two different core nodes.

Figure 2:
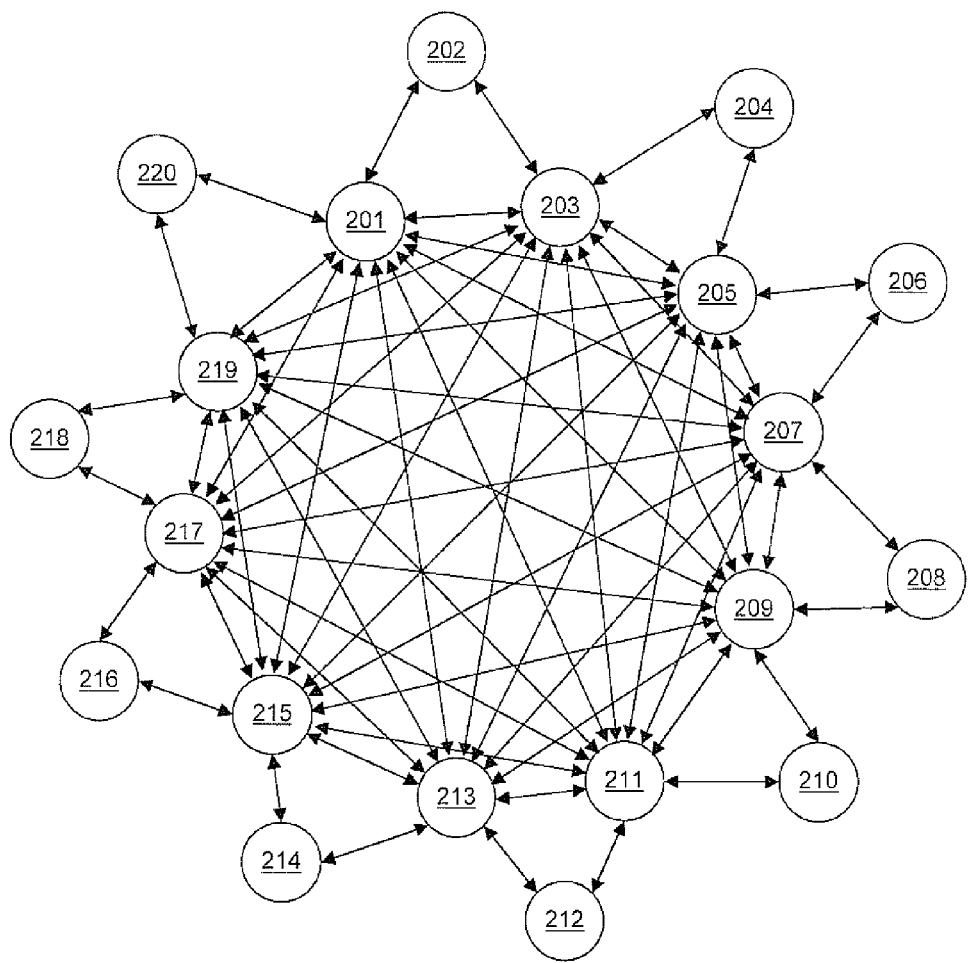
FIG. 2 illustrates an example LSA flooding across the communications network of FIG. 1 according to the prior art.

In flooding methods previously practiced in the art, whenever a node receives an LSA that is not a duplicate of a previously received LSA, it forwards a copy of that LSA to all of its direct neighbors except the one from which it received the LSA. Thus, all the edges (links) of the original network are included in the flooding topology. i.e., LSAs are forwarded along all edges of the original network. This method is illustrated in FIG. 2 where all the edges of the original network are shown as solid, bi-directional arrows.

The following figures showing embodiments of the invention have the convention that if an edge is represented by a solid line, it is used for forwarding an LSA. The directions of the arrowheads attached to an edge indicate the possible directions of LSA forwarding. Thus, an edge with bi-directional arrowheads indicates that LSAs can be forwarded in either direction. If an edge has a single arrowhead attached to it, it means that LSAs can be forwarded only in that direction. Notice that as FIG. 2 indicates, in the previously practiced flooding method all the edges of the original are included in the flooding topology and that LSAs can be forwarded in either direction along these edges. Thus, for instance, if node 105 receives an LSA from node 101 (over the link connecting nodes 101 and 105) indicating that some link is down, node 105 will forward that LSA to all of it direct neighbors except 101 from which it received the LSA. Thus, node 105 will forward the LSA to nodes 103, 105, 107, 109, 111, 113, 115, 117, 119, 104 and 106 along the corresponding edges. These nodes in turn will repeat this procedure unless they have already received that LSA via some other route. A consequence of this fact is that in certain fault scenarios, i.e. when a core node goes down, a veritable storm of LSAs floods through the network, resulting in a long convergence time. Embodiments of the present invention operate to mitigate this problem by putting suitable constraints on the flooding process to reduce the number of duplicate LSAs that get generated during such events.

Construction of LSA-Forwarding Subgraph

In embodiments of the present invention as LSAs are forwarded only along the edges (links) included in the LSA-forwarding subgraph, the latter needs to be constructed in such a manner as to ensure reliable propagation of LSAs while reducing the number of duplicate LSAs that are generated in the forwarding process.

Construction Method

Following is one such method that can be used in typical modern-day networks with densely interconnected core nodes and relatively sparsely connected edge nodes. For a given network, the proposed method constructs an LSA-forwarding subgraph in the following manner.

First, construct a core-node subgraph connecting all of the core nodes. The core-node subgraph comprises a union of a quantity K spanning trees that have the following properties:
1. The trees are edge-disjoint (i.e. they do not have any edges in common);
2. Within each of these trees, no node can have a degree greater than degree N; and
3. A core node can appear as a node in more than one spanning tree only insofar that its overall degree in the K spanning trees is at most a quantity M.

While it is possible that in some networks these conditions may be too restrictive to yield K spanning trees that have the above properties, the core nodes of modern-day communication networks are so densely interconnected that finding a quantity K spanning trees with the desired properties is readily possible.

Next, all the edges that connect to an edge node are added to the quantity K spanning trees. The resulting subgraph is an example of a desired LSA forwarding subgraph.

In the construction of the LSA forwarding subgraph the reason for requiring the spanning trees to be edge-disjoint is to provide a plurality of alternate paths for LSAs to get to all nodes in the event of major link/node failure. Additionally, the reason for placing a limit on the degree of a node is make sure that no node is of such importance in the LSA forwarding scheme that its failure can prevent LSAs from reaching certain parts of the network. The same reason underlies the third condition placed on the construction of the core-node subgraph.

Figure 3A:
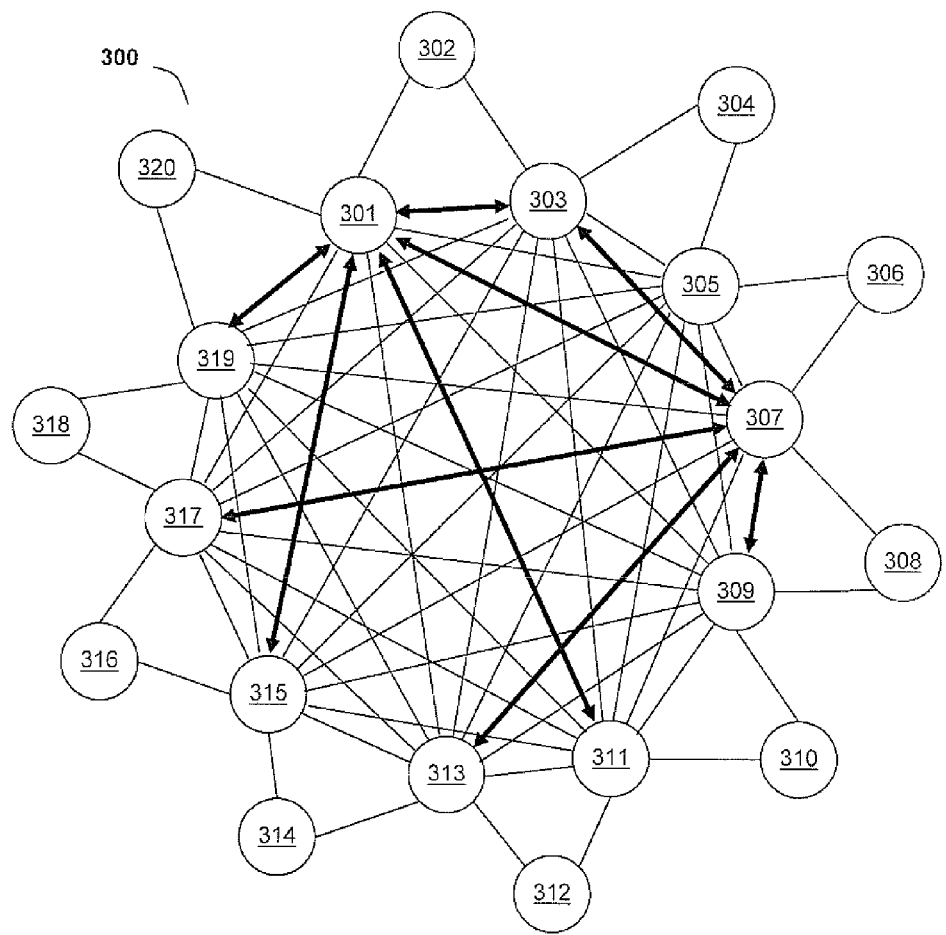
FIGS. 3a-3c illustrates the production of an LSA forwarding subgraph in accordance with an embodiment of the present invention.
Figure 3B:
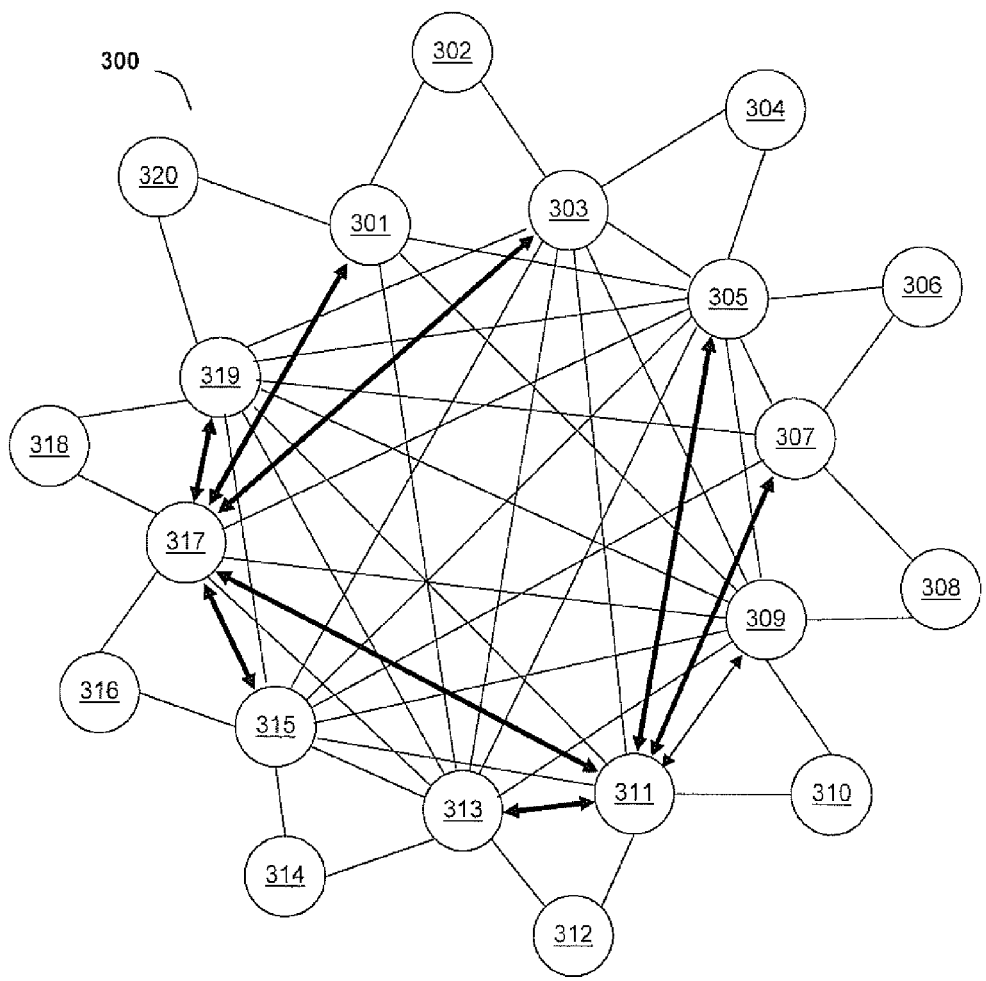
Figure 3C:
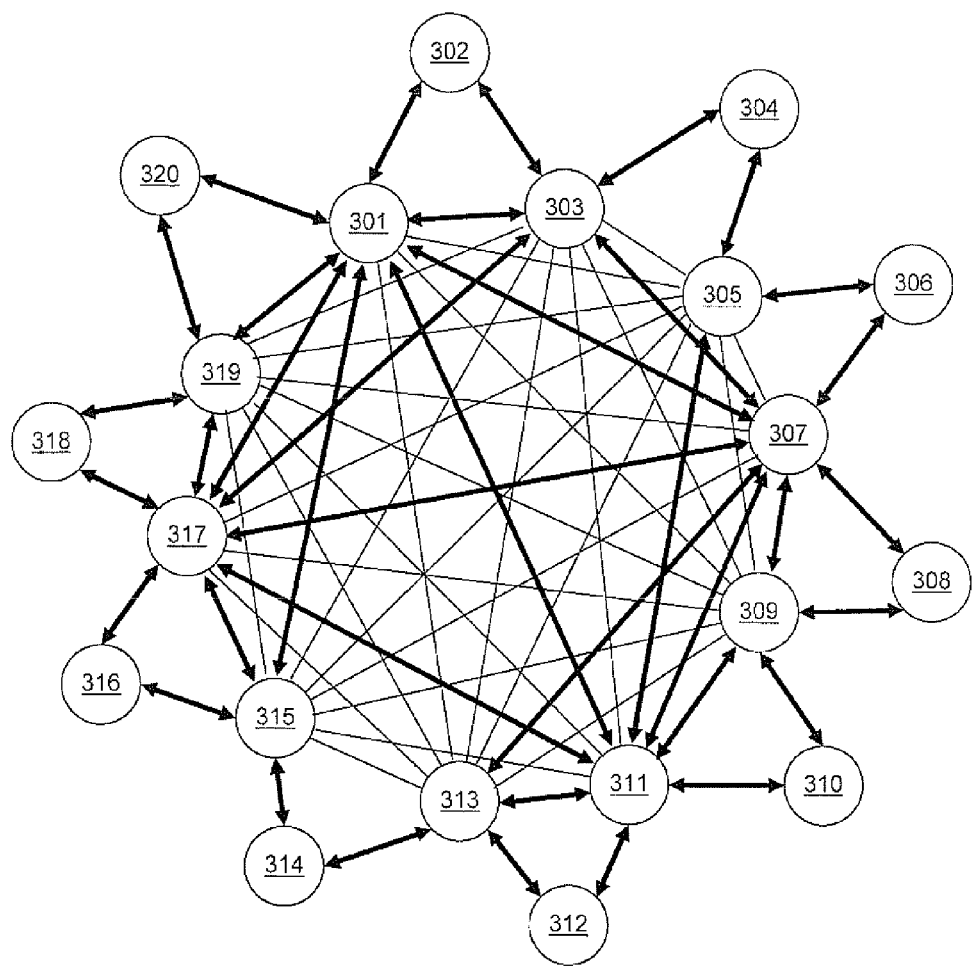

Referring now to FIG. 3c there may be seen an LSA forwarding subgraph constructed in accordance with this method for the network of FIG. 1. In this figure a quantity of K=2 was used, i.e. there are two spanning trees in the core-node subgraph, and a quantity N=5 was used, i.e. no node in either of these subtrees has a degree greater than 5. Further, in this figure a quantity of M=6 was used.

The trees in the core-node subgraph illustrated in FIG. 3c were constructed as follows. Referring to FIG. 3a, the first tree is built using node 301 as its root. Since the limit on a node's degree (N) equals 5, five of 301's neighbors (namely, nodes 315, 311, 307, 303 and 319) and the corresponding links were added to the tree. Since the limit on the node's degree had now been reached for node 301 and there were further core nodes to be added to the tree, it is necessary to select one of the nodes included in the tree that has not yet reached its degree limit. The node selected for growing the tree was node 307. This node already had a degree of 1 since its link to node 301 had already been included in the tree. Thus, at most four more nodes could be added to the tree from this node. Fortunately, there are only four more nodes yet to be included in the tree and they all had direct links to node 307. Thus, these nodes (and the corresponding links to node 307) are added to the spanning tree, which now reached all of the core nodes in the network. At this stage the construction of the first spanning tree was complete and may be seen as the bold lines with bi-directional arrowheads.

Since K=2, it is necessary to build another spanning tree that did not have any edges in common with the first spanning tree and which was consistent with conditions 2 and 3 listed above. This is illustrated in FIG. 3b. In the building of this second spanning tree it is necessary to remove all of the edges included in the first spanning tree so that the new spanning tree would be edge-disjoint with the first. In FIG. 3b all the edges corresponding to the first spanning tree have been removed. The building of the second tree may be commenced by choosing one of the leaf nodes of the first spanning tree as the root node of the second spanning tree. For this example, node 311 is used. Starting from node 311, 5 of its neighbors, namely 305, 307, 309, 313, and 315 (and the corresponding links) are added to the second spanning tree. Next using one of these nodes that had not appeared as a non-leaf node in the first tree, the second tree is built further. The node selected at this stage to build the tree further in this example is node 317. Adding all of the remaining nodes of the core network to the second spanning tree using edges connecting them to node 317 continues to satisfy condition 2. Thus, the construction of the second spanning tree, illustrated as the bold lines with bi-directional arrowheads in FIG. 3b is completed at this stage. It is easy to verify that the two spanning trees are consistent with the requirements stated earlier.

Note that in this example there are two spanning trees (K=2) with an upper degree limit of five (N=5) and an overall degree limit of six (M=6) for a node across the multiple spanning trees. In the example given above, a non-leaf node in the second tree was chose to be a leaf node in the first tree. Using leaf nodes of the first tree, the permissible combinations of a core node's degrees in the two trees are (1,1), (2,1), (3,1), (4,1), (5,1), (1,2), (1,3), (1,4), and (1,5).

By utilizing the overall degree limit of quantity M, an additional quantity of combinations are possible, namely (2,2), (2,3), (2,4), (3,2), (3,3), (4,2). Thus, given a limit on the aggregate degree, there is more flexibility in constructing an LSA forwarding subgraph than that of confining subsequent spanning trees to using only leaf nodes of the other trees. Therefore it can be seen that increases in M provide for greater flexibility in designing the subgraph, thus reducing the likelihood of the requirements becoming infeasible for a given real world network.

Once the core-node subgraph comprising two spanning trees was constructed as described above, the completed LSA forwarding subgraph may be formed as the combination of these two spanning trees and all of the links connecting edge nodes 302, 304, 306, 308, 310, 312, 314, 316, 318, and 320. The overall LSA forwarding subgraph constructed according to this example comprises all edges shown in bold lines with bi-directional arrowheads in FIG. 3c.

Constructing trees in a communication network (represented by a graph) is a straightforward procedure. Consequently, one skilled in the art can follow the method described earlier to construct a desired LSA forwarding subgraph in accordance with the present invention.

According to one embodiment of the invention, implementation of the LSA forwarding subgraph construction would be centralized wherein some centrally located node with administrative responsibilities would construct the desired LSA forwarding subgraph based on its knowledge of the global network topology and distribute information regarding this subgraph to all the nodes of the network so that they can all forward LSAs in a consistent manner.

Alternatively, according to another embodiment of the invention, a distributed implementation of the method for constructing the LSA forwarding subgraph would be used. In the distributed approach, different nodes independently construct their own version of the LSA forwarding subgraph based on their knowledge of the global topology. In order to ensure that such subgraphs constructed by different nodes of the network are consistent with one another, it is required that all nodes follow the same procedure when they construct the spanning trees, thus building their respective LSA forwarding subgraphs. This requirement can be met fairly easily if some order is imposed in the tree-building procedure. For instance, a requirement that while building a spanning tree each node must first select as the root of the tree the lowest-index node which has a degree at least equal to N. If no node can be found with a degree N or larger, then the node with the maximal degree which has the lowest index among all such nodes is selected as the root. Next, the N lowest-index neighbors of the root (and the corresponding edges) are added. If the root has a degree less than N, then all of the root node's neighbors are added to the tree which is being built. Subsequently, the node makes the tree grow from the lowest-index node with the maximal degree that has already been added to the tree, and so on. As described in the specific example illustrated by FIG. 3, a node is not selected to grow the tree if it has already been a non-leaf node in a previously constructed tree in order to ensure that condition 2 remains satisfied. If all nodes of the network follow this kind of order while constructing their respective LSA forwarding subgraphs, it will ensure that the resulting subgraphs are consistent with one another.

LSA Forwarding Methods

According to a first method of embodying the invention, once an LSA forwarding subgraph is defined, each node forwards LSAs only along the edges included in the subgraph, with no further restrictions. Note that when a link goes down, according to LSA generation rules, nodes at both ends of the link must generate a corresponding LSA, regardless of whether that link was included in the LSA forwarding subgraph. However, once an LSA is generated, it is forwarded only along the edges included in the LSA forwarding subgraph. Similarly, when a node goes down, each of its direct neighbors will generate a corresponding LSA, regardless of whether the link connecting that neighbor node to the failed node was included in the LSA forwarding subgraph. The LSA forwarding, of course, takes place along the edges included in the LSA forwarding subgraph.

Figure 4:
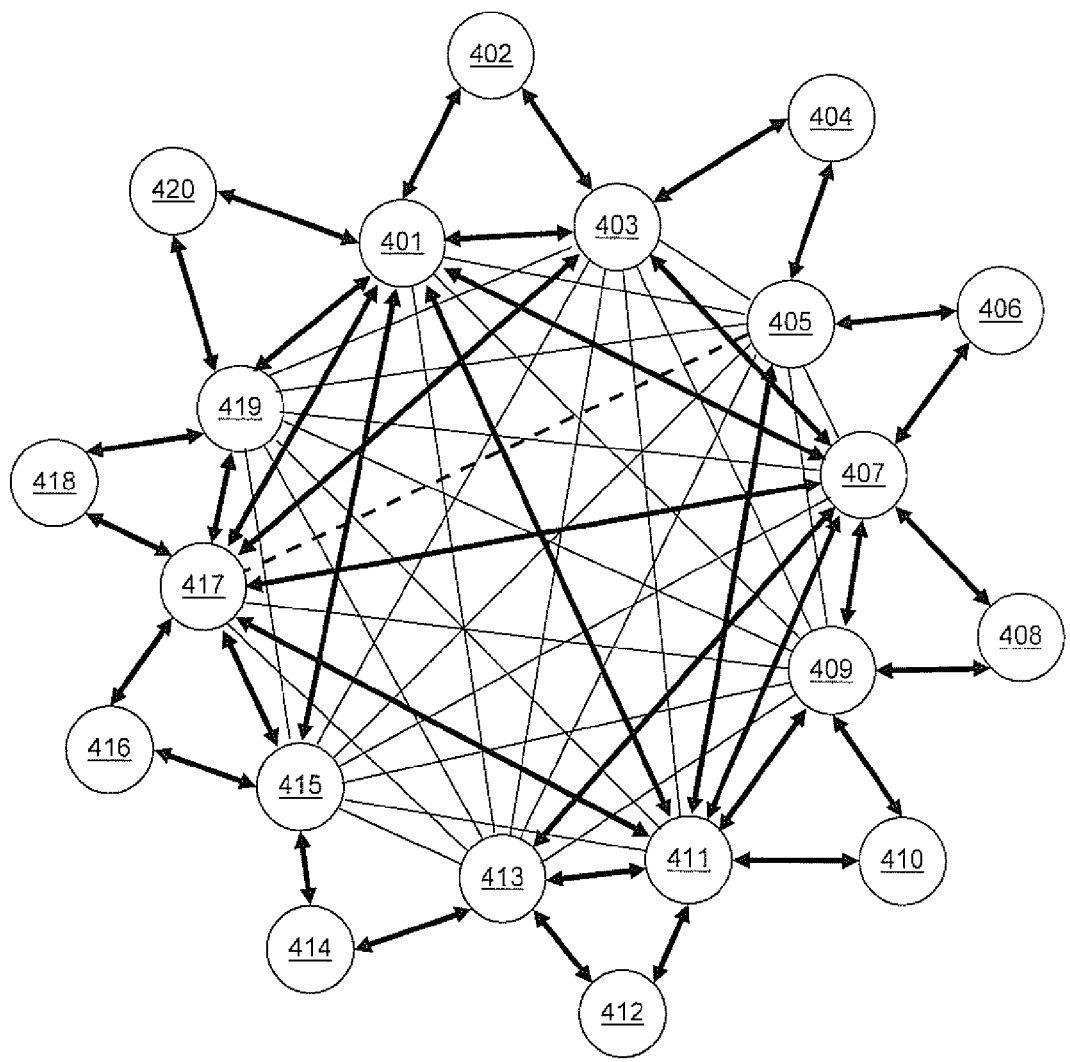
FIG. 4 illustrates the set of LSA forwarding paths according to an LSA forwarding method in accordance with an embodiment of the present invention.

As an illustration, consider the event where the link connecting nodes 405 and 417 (which has not been included in the LSA forwarding subgraph) goes down, as shown as the bold dashed line in FIG. 4. In this event, both nodes 405 and 417 will generate their respective LSAs (which will be distinct from each other.) Node 405 will forward this LSA to 411, 407, 404 and 406, whereas node 417 will forward its LSA to nodes 415, 411, 407, 403, 401, 419, and edge nodes 416 and 418. When node 407 receives the LSA generated by node 405, it forwards it to nodes 413, 411, 409, 401, 417, and edge nodes 406 and 408. In a similar manner all core nodes forward the LSA only along the edges included in the LSA forwarding subgraph. The edge nodes also follow a similar procedure. Thus, for instance, when edge node 408 receives the LSA generated by node 405 via node 407, it forwards it to its only other neighbor, namely node 409 (since the corresponding link has been included in the LSA forwarding subgraph.) Note that this procedure does not completely eliminate the generation of duplicate LSAs; however it does reduce the number of duplicates, particularly in large networks with densely interconnected cores.

Figure 5:
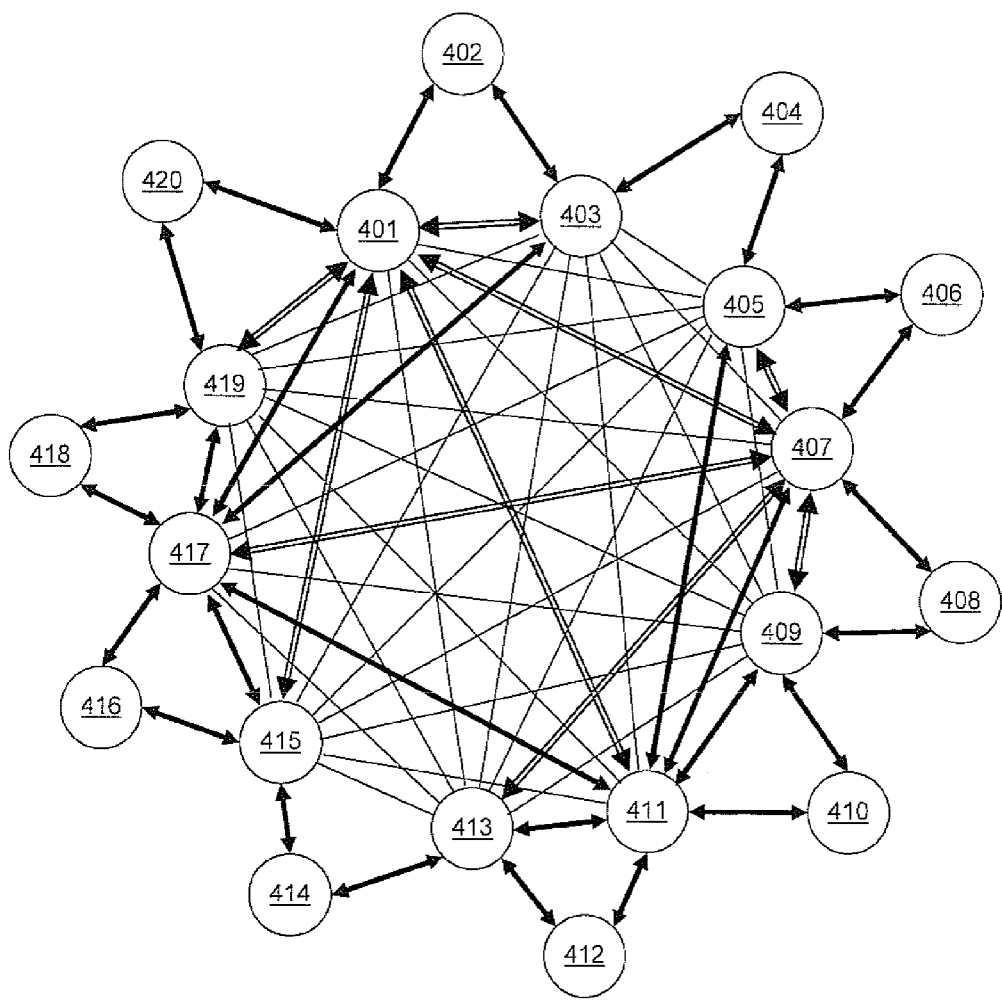
FIG. 5 illustrates the set of LSA forwarding paths according to an alternative LSA forwarding method in accordance with an alternative embodiment of the present invention.

According to a variation of the just described method of LSA forwarding, the nodes forward LSAs as described in the previous method with the exception that edge nodes do not forward LSAs. That is, an edge node receives LSAs from its neighboring core nodes; however, after processing it (and possibly computing new routing structures), it does not forward it other neighboring nodes as in the first method. Thus, in the fault scenario described in the previous example, nodes 405 and 417 will generate LSAs due to the broken link between them and, as described earlier, forward them to their neighboring nodes along edges corresponding to the LSA forwarding subgraph. The core nodes among these neighboring nodes will forward them to their neighbors exactly as described earlier. However, the edge nodes will only receive these LSAs; they will not forward them further. Thus, when node 408 receives the LSA generated by node 405 (via node 407), it will not forward it to node 409. This alternative method results in a further reduction of duplicate LSAs in comparison to the first method. However, it can only be employed in situations where each edge node is connected at least one core node. FIG. 5 illustrates this LSA forwarding method.

According to an alternative embodiment of the invention during LSA forwarding, core nodes not only adhere to the overall LSA forwarding subgraph while forwarding LSAs, they also take into account the individual spanning trees that make up the LSA forwarding subgraph. That is, if a core node receives an LSA over an edge belonging to a specific spanning tree included in the LSA forwarding subgraph, it forwards it only over the remaining edges of that same tree that are incident at that node. It does not forward it over edges belonging to other spanning trees incident at that node. Referring to FIG. 5 the LSA forwarding subgraph has two spanning trees distinguished by one having a solid bold line and the other a doubled bold line. Thus, for instance, if node 507 in FIG. 5 receives a non-duplicate LSA from node 505 over the link 507-505, because that has been included in the "doubled-line" tree, node 507 will forward it only over the links 507-513, 517-509, 507-501 and 507-517, all of which have also been included in the "doubled-line" tree. Node 507 will not forward the LSA over the link 507-511 because it is not a part of the "doubled-line" tree. (Notice that the link 507-511 has been included in the "bold-line" tree, and, as such, is part of the overall LSA forwarding subgraph.) This restriction applies only to LSA forwarding to core nodes. Insofar as edge nodes are concerned, this method emulates the logic of the variation described previously. That is, if a core node receives an LSA that is not a duplicate of a previously received LSA, it forwards it to every edge node that is directly connected to it. (Thus, in the current example, core node 507 will forward the LSA to both of the edge nodes—508 and 506—that are directly connected to it.) Also, as in the variation described previously, edge nodes receive LSAs without forwarding them. This alternative embodiment leads to even greater reduction in the generation of duplicate LSAs, since it has the property that each node will receive at most one copy of the LSA for each tree it belongs to. However, it may lose some of the desired redundancy in LSA propagation, which could be compensated for by using multiple trees, i.e., with a larger K.

Figure 6:
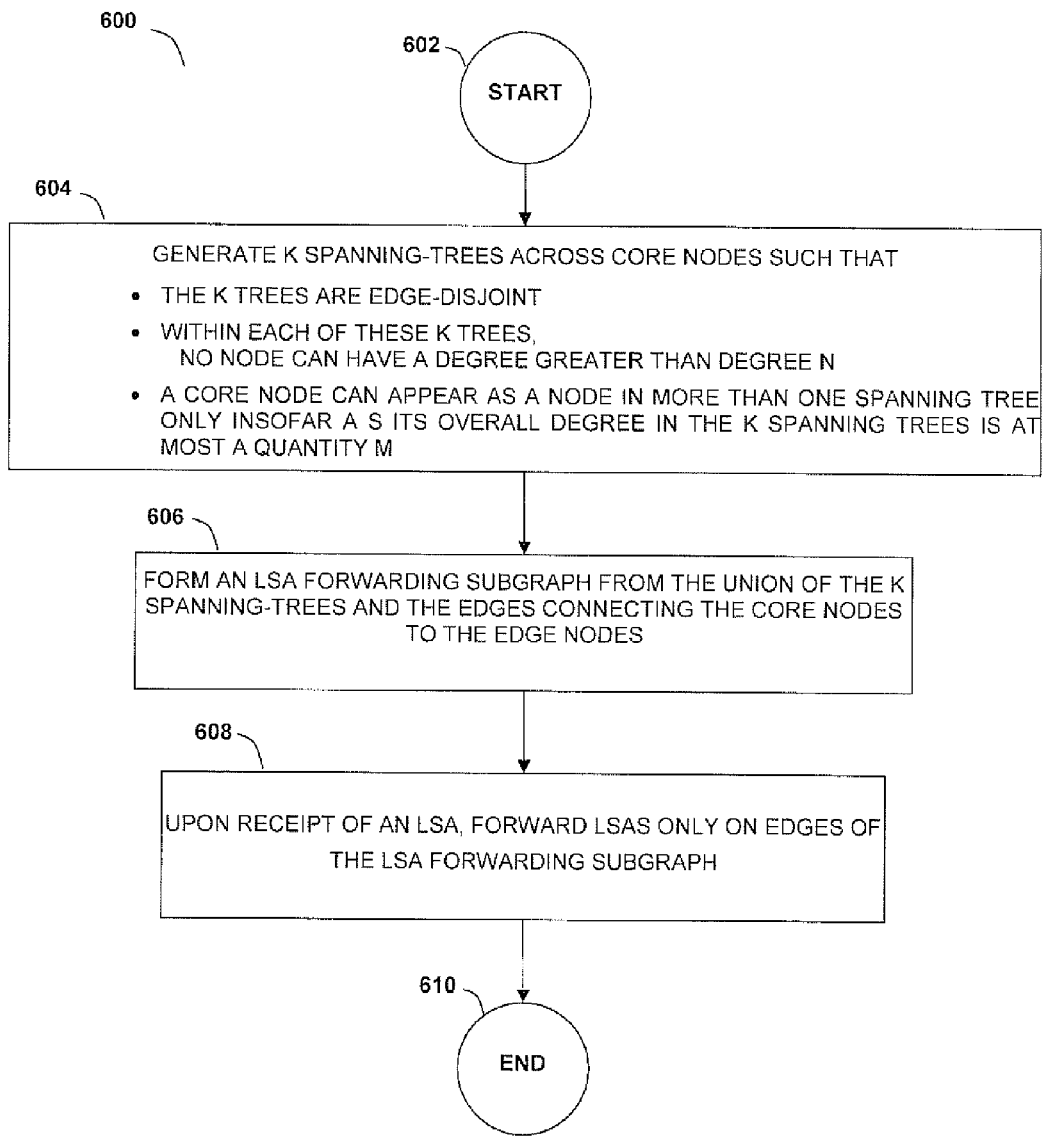
FIG. 6 illustrates a series of method steps according to an embodiment of the LSA forwarding method of the invention.

Referring now to FIG. 6 there may be seen a flowchart 600 of the method steps of an embodiment of the invention using the LSA forwarding subgraph with a forwarding method. The method commences at step 602, followed by step 604 of generating K spanning trees across the core nodes of the network such that:

the K spanning-trees are edge-disjoint within each of the K spanning-trees no node can have a degree greater than N a core node can appear as a node in more than one spanning tree only insofar as its overall degree in the K spanning trees is at most a quantity M Next, at step 606, the LSA forwarding subgraph is formed from the union of the K spanning-trees and the edges connecting the core nodes to the edge nodes.

At step 608 each node proceeds to forward received LSAs only along the edges of the LSA forwarding subgraph.

The method ends at step 610.

Accordingly, what has been disclosed are methods and systems for reducing the number of duplicate LSAs that are produced during a flooding event. Alternatives among the forwarding methods have been disclosed that can operate to further reduce the number of duplicate LSAs that are produced. A method of producing an LSA forwarding subgraph was disclosed, and variations on where the LSA forwarding subgraph may be produced were also disclosed.

Note that in the preceding discussion a person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover special purpose computers programmed to perform said steps of the above-described methods.

Numerous modifications, variations and adaptations may be made to the embodiment of the invention described above without departing from the scope of the invention, which is defined in the claims.

What is claimed is:

1. A method of reducing, in a network having a plurality of core nodes and a plurality of edge nodes connected by links, the number of duplicate link-state advertisements (LSAs) propagated during a flooding event, said method comprising the steps of:

forming an LSA forwarding subgraph wherein the edges of said LSA forwarding subgraph correspond to said links, and said LSA forwarding subgraph comprises the union of a quantity K spanning-trees containing said core nodes and the links connecting said core nodes to said edge nodes, and wherein said K spanning-trees are edge-disjoint, and where within each of the K spanning-trees no core node can have a degree greater than quantity N, and where a core node appears as a node in more than one tree of said quantity of K spanning-trees only insofar that an overall degree of said core node in the K spanning trees is at most a quantity M, wherein K, M, and N are integers greater than 1; and upon a core node in said network receiving an LSA along a first link during said flooding event, said core node forwarding said LSA along only a first subset of links corresponding to edges in said LSA forwarding subgraph; and upon an edge node in said network receiving an LSA along a first link during said flooding event, said edge node forwarding said LSA along only a second subset of links corresponding to edges in said LSA forwarding subgraph.

2. A method as claimed in claim 1 wherein said first subset comprises any link that corresponds to edges in said LSA forwarding subgraph that are incident on said core node.

3. A method as claimed in claim 2 wherein said second subset comprises any link that corresponds to edges in said LSA forwarding subgraph that are incident on said edge node.

4. A method as claimed in claim 2 wherein said second subset comprises no links.

5. A method as claimed in claim 1 wherein said first subset comprises those links incident on said core node that correspond to edges of the spanning-tree of said quantity K spanning-trees of which said first link is a member in said LSA forwarding subgraph.

6. A method as claimed in claim 5 wherein said second subset comprises any link that corresponds to edges in said LSA forwarding subgraph that are incident on said edge node.

7. A method as claimed in claim 5 wherein said second subset comprises no links.

8. A system that reduces the number of duplicate link-state advertisements (LSAs) propagated during a flooding event, said system comprising:

a plurality of core nodes;

a plurality of edge nodes, and wherein said plurality of core nodes and said plurality of edge nodes are connected by links;

an LSA forwarding subgraph calculator which automatically calculates an LSA forwarding subgraph wherein the edges of said LSA forwarding subgraph correspond to said links, and said LSA forwarding subgraph comprises the union of a quantity K spanning-trees containing said core nodes and the links connecting said core nodes to said edge nodes, and wherein said K spanning-trees are edge-disjoint, and where within each of the K spanning-trees no core node can have a degree greater than quantity N, and where a core node appears as a node in more than one tree of said quantity of K spanning-trees only insofar that an overall degree of said core node in the K spanning trees is at most a quantity M, wherein K, M, and N are integers greater than 1; and a core node forwarding module in each core node of said plurality of core nodes which upon its respective core node receiving an LSA along a first link during said flooding event, said core node forwarding module forwarding said LSA along only a first subset of links corresponding to edges in said LSA forwarding subgraph; and an edge node forwarding module in each edge node of said plurality of edge nodes which upon its respective edge node receiving an LSA along a first link during said flooding event, said edge node forwarding module forwarding said LSA along only a second subset of links corresponding to edges in said LSA forwarding subgraph.

9. A system as claimed in claim 8 wherein said first subset comprises any link that corresponds to edges in said LSA forwarding subgraph that are incident on said core node.

10. A system as claimed in claim 9 wherein said second subset comprises any link that corresponds to edges in said LSA forwarding subgraph that are incident on said edge node.

11. A system as claimed in claim 9 wherein said second subset comprises no links.

12. A system as claimed in claim 8 wherein said first subset comprises those links incident on said core node that corresponds to edges of the spanning-tree of said quantity K spanning-trees of which said first link is a member in said LSA forwarding subgraph.

13. A system as claimed in claim 12 wherein said second subset comprises any link that corresponds to edges in said LSA forwarding subgraph that are incident on said edge node.

14. A system as claimed in claim 12 wherein said second subset comprises no links.

15. A system as claimed in claim 8 wherein said LSA forwarding subgraph calculator is located at a single location and which propagates said LSA forwarding subgraph to said plurality of core nodes and said plurality of edge nodes.

16. A system as claimed in claim 8 wherein said LSA forwarding subgraph calculator is located at each of said plurality of core nodes and said plurality of edge nodes.

* * * * *